United States Patent [19]

Zellhoefer

[11] 4,156,057

[45] May 22, 1979

[54] SECONDARY HEAT SYSTEM FOR THERMAL BATTERIES

[75] Inventor: Glenn F. Zellhoefer, Normal, Ill.

[73] Assignee: National Union Electric Corporation, Stamford, Conn.

[21] Appl. No.: 114,052

[22] Filed: Jun. 1, 1961

[51] Int. Cl.$^2$ .............................................. H01M 6/30
[52] U.S. Cl. .................................................... 429/112
[58] Field of Search ................. 136/83, 83.1, 90, 90.5, 136/120, 125; 257/248; 252/67; 429/112

[56] References Cited

U.S. PATENT DOCUMENTS

| | | | |
|---|---|---|---|
| 856,162 | 6/1907 | Kitsee | 73/359 R |
| 1,696,873 | 12/1928 | Wood | 429/201 |
| 2,081,926 | 6/1937 | Gyuris | 429/102 |
| 2,102,701 | 12/1937 | Gyuris | 429/29 |
| 2,500,790 | 3/1950 | Bennett | 126/263 |
| 2,921,110 | 1/1960 | Crowley et al. | 429/29 |
| 2,999,122 | 9/1961 | Zauner | 429/112 |

OTHER PUBLICATIONS

McKee et al., "Tenth Annual Battery Research Conference", pp. 26–28, May 24, 1956.
Goodrich et al., "J. of Electro Chem. Society", Aug. 1952, vol. 99, No. 8, pp. 2076, 2086.

*Primary Examiner*—Leland A. Sebastian
*Attorney, Agent, or Firm*—Merriam, Marshall & Bicknell

EXEMPLARY CLAIM

1. In a thermal battery, the combination in stacked arrangement of (A) a cell assembly containing at least one fusible electrolyte cell including a mass of fusible electrolyte, a cathode, an anode, and heat producing means for energizing the cell, (B) heat sink means comprising at least one heat sink unit disposed at each opposite side of said cell assembly, said unit comprising a protective metal housing containing a fusible metal having a fusion temperature between the maximum operating temperature and the minimum activation temperature of said cell assembly, (C) heat producing means interposed between said cell assembly and the innermost sides of said heat sink units and also disposed at the outermost sides of said heat sink units for fusing said fusible metal, and (D) thermal insulation means at the outermost sides of the stacked arrangement.

5 Claims, 10 Drawing Figures

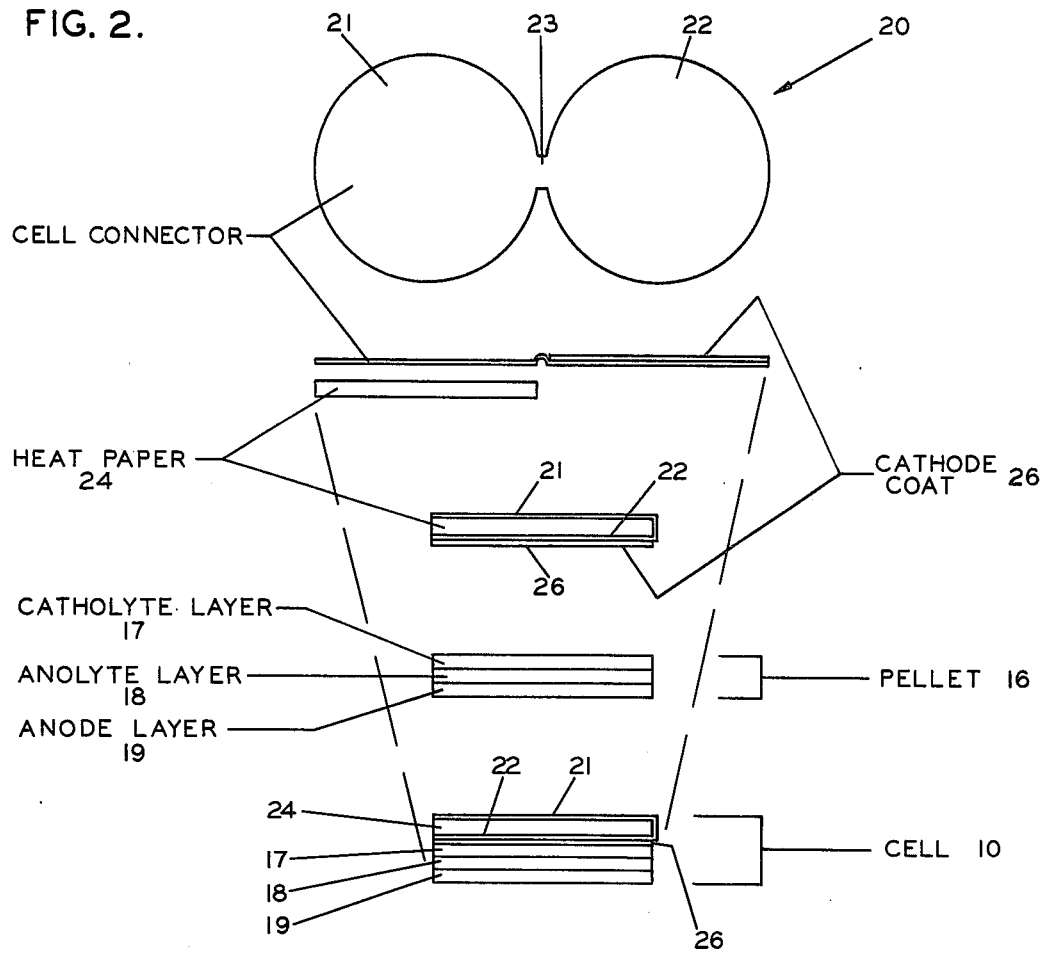
FIG. 2.
FIG. 1.
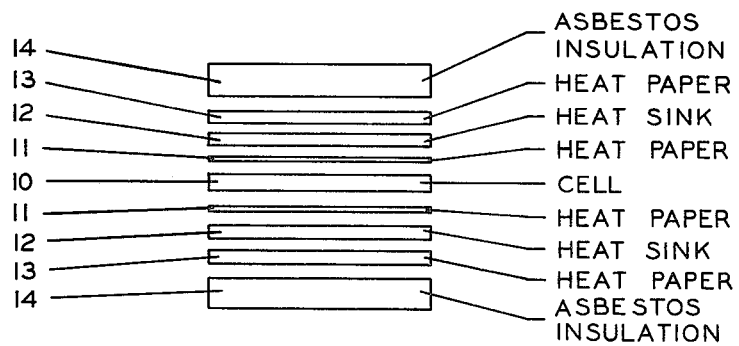
INVENTOR.
GLENN F. ZELLHOEFER
BY George N. Hibben FIG. 5.
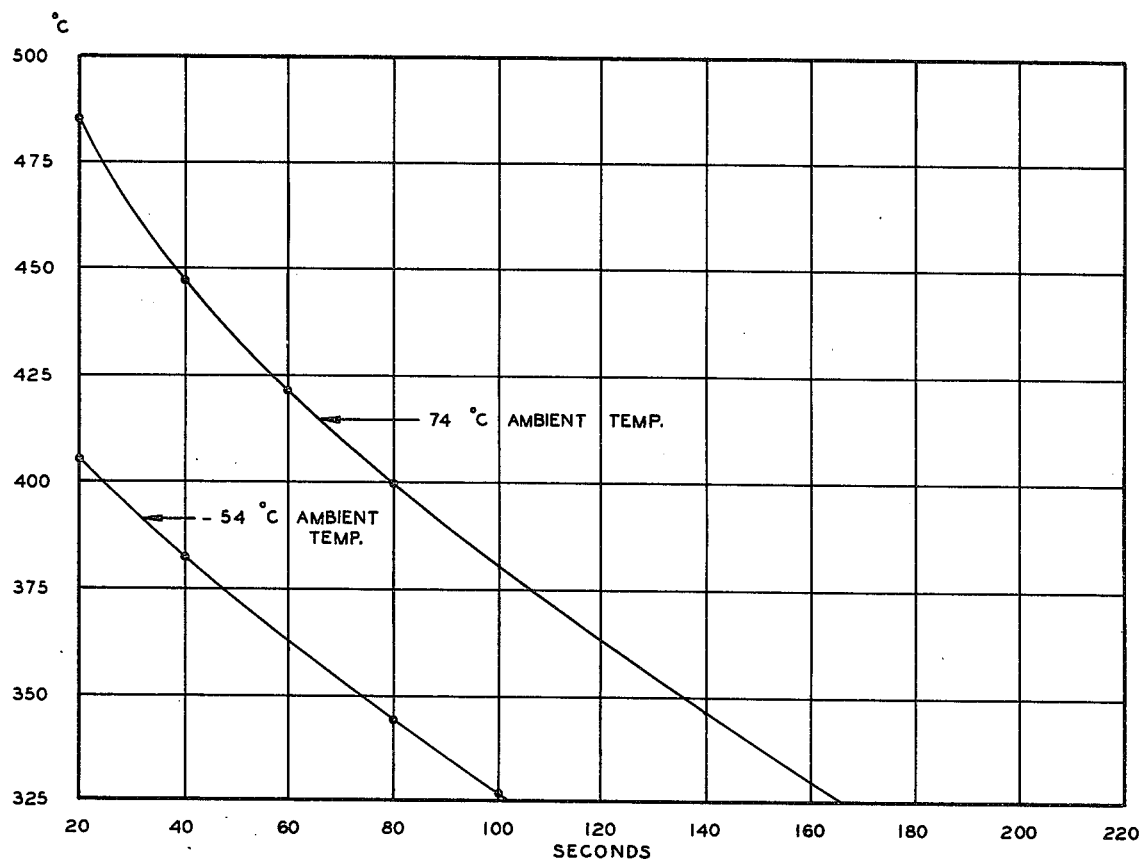
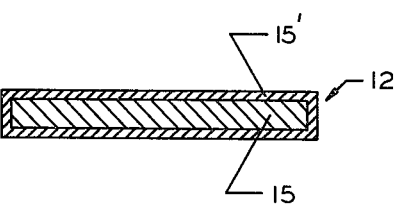
FIG. 9.
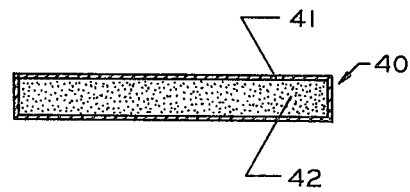
FIG. 10.

INVENTOR.
GLENN F. ZELLHOEFER
BY George N. Hibben

SECONDARY HEAT SYSTEM FOR THERMAL BATTERIES

This invention relates to improvements in thermal batteries and more particularly to a novel and improved secondary heat system for use in thermal batteries designed to operate over an extended period of time.

Fused electrolyte cells in thermal batteries are electrochemical power supplies based on electrolytes of various inorganic salts, particularly alkali halides, which remain solid and nonconductive at storage temperatures. When a cell is heated to an elevated temperature, the electrolyte fuses and becomes conductive and electrical energy may be withdrawn from the system. In order to develop the maximum energy under any given load and within the useful voltage range, it is essential that the operating temperature of the cells be maintained within a rather narrow range which is determined by the nature of the particular electrochemical system employed and also upon the current drain.

Activation of a thermal cell is effected by supplying sufficient heat to fuse the normally solid electrolyte system. The activator may conveniently be integral with or built into the battery, e.g. any well known essentially gasless pyrotechnic means based on exothermic chemical reaction such as "heat paper" disposed in close physical proximity to the cell or cells. However, thermal batteries have heretofore been characterized by a relatively short useful operating life which is primarily dependent on the regulation of cell temperatures. Obviously, once the initial activating source of heat has been dissipated, the cells will begin to cool and eventually will fall below their minimum operating temperature.

A principal object of this invention is to provide a new and improved thermal battery including a novel secondary heat system which lengthens the useful operating life of the battery.

Another object of the invention is to provide a new and improved secondary heat system for thermal batteries.

A further object of the invention is to provide in a thermal battery a novel heat sink comprising a fusible metal having good thermal conductivity, low specific heat, high heat of fusion, and a fusion temperature between the maximum operating temperature of the cells and their minimum activation temperature.

A still further object is to provide a heat sink of the foregoing character in which the fusible metal is zinc.

Other objects and advantages of the invention will become apparent as this description progresses, reference being had to the accompanying drawings in which:

FIG. 1 is a diagrammatic, expanded, side elevational view of a single cell thermal battery embodying the secondary heat system of the present invention;

FIG. 2 is an expanded view illustrating in somewhat diagrammatic form the various elements comprising the cell of FIG. 1 and also showing the various stages in the assembly of the cell;

FIG. 5 is a graph showing the temperatures of a steel heat sink in a single cell thermal battery over elapsed periods of time when the battery is activated at different ambient temperatures;

FIG. 9 is an enlarged sectional view of one embodiment of a heat sink element;

FIG. 10 is a view similar to FIG. 9 but showing a preferred embodiment of the heat sink element.

Figure 3:
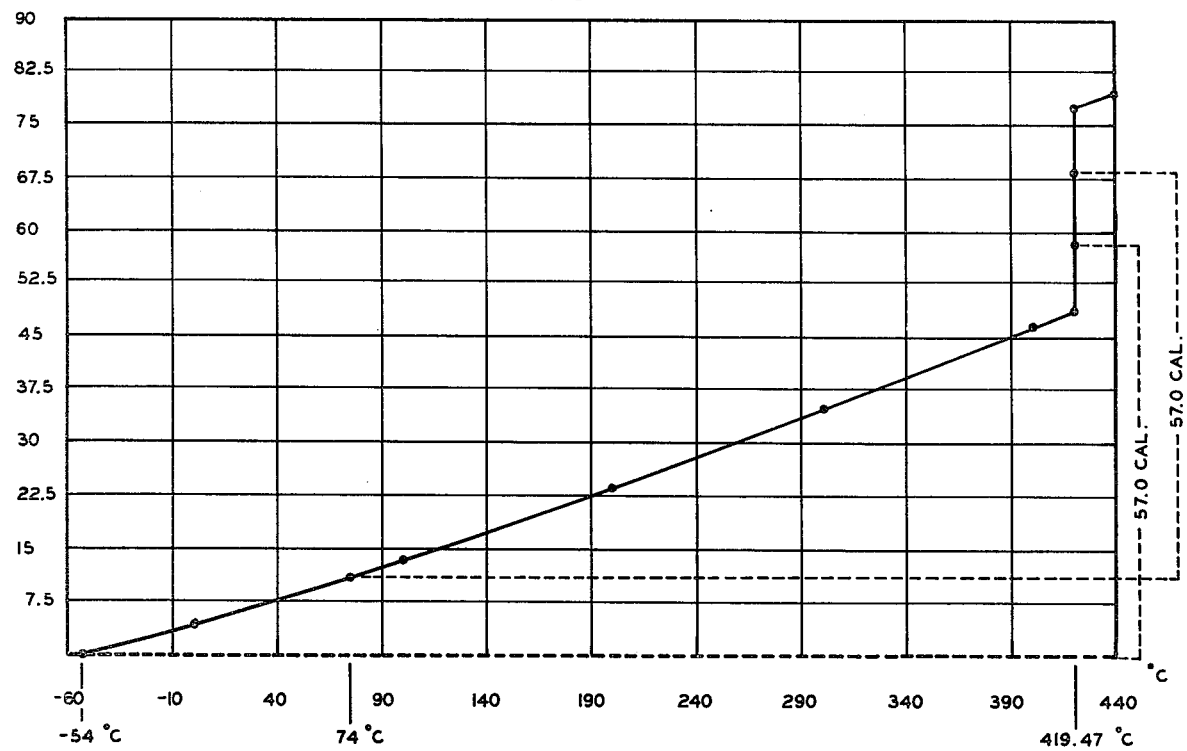
FIG. 3 is a graph showing the heat capacity for zinc metal over a temperature range of from −54° C. to 440° C.

Broadly speaking, the objects of the invention are accomplished by providing a fusible metal heat sink assembly at each end of the stack of thermal cells. A thermal insulator is provided at the outer face of each of the end heat sink assemblies. Each heat sink assembly comprises one or more heat sink elements having heat source material, such as a heat paper pad, disposed adjacent each face of each heat sink element. The fusible metal comprising the heat sink element should have high thermal conductivity, relatively high latent heat of fusion with relatively low specific heat, high specific gravity, and a fusion temperature which is between the maximum operating temperature and the minimum activation temperature of the thermal cells, preferably about midway between said temperatures. As will hereinafter appear, zinc is the preferred metal for the fusible heat sink element in several different types of thermal batteries, but other appropriate metals or alloys can also be used in other types of batteries, e.g. an alloy comprising 68 wt. % magnesium and 32 wt. % aluminum. The system is designed to obtain fusion of the heat sink metal during activation of the battery over a wide ambient temperature range (−54° C. to +74° C.), and the heat sink serves to offset radiation losses at the operating temperatures of the battery thereby prolonging its active life.

Referring more particularly to FIGS. 1 and 2 of the drawings, there is illustrated a single cell thermal battery embodying the secondary heat system of the present invention. This battery comprises a thermal cell 10 having layers of heat paper 11 disposed above and below it and heat sink elements 12 disposed above and below the heat paper layers 11. Further layers of heat paper 13 are positioned above and below the heat sinks 12 on the outer sides thereof, and thermal insulation layers 14 of asbestos or the like are disposed at the extreme ends of the battery. Although not shown in the drawing, it will be understood that the entire battery assembly is encased in a can or the like.

As shown in FIG. 9, each heat sink element 12 may comprise a disk 15 of zinc metal sealed in a housing 15' of protective metal, e.g. nickel or a nickel alloy such as Inconel. The housing 15' protects the zinc 15 from reaction with the heat paper layers 11 and 13 during exothermic reaction or combustion of the latter and also serves to retain the zinc 15 when it is molten. The wall thickness of the housing 15' should be kept to a minimum, usually from about 0.007 to about 0.012 inches.

In FIG. 10 a preferred form of the zinc heat sink element is shown at 40 which comprises a steel or Inconel casing 41 containing a pelletized mixture 42 of zinc powder and a suitable refractory non-flow immobilizing agent such as zirconium oxide or alumina powder. Typical mixtures which have been found suitable are, by way of example, a mixture of 90 wt. % zinc powder (−325 mesh) with 10 wt. % zirconium oxide (200–300 mesh), and a mixture of 94 wt. % zinc powder (−325 mesh) with 6 wt. % laminar alumina powder (200–300mesh). The non-flow or immobilizing agent prevents flow of the zinc when the latter melts. Accordingly, in this instance the casing 41 functions to protect the zinc from reaction with the adjacent heat paper layers during the period of combustion, and the wall thickness of the casing may therefore be substantially less than in the FIG. 9 embodiment. For example, a housing 41 of steel having a wall thickness of 0.001 to 0.002 inches is entirely satisfactory for this purpose. The non-flow properties of the pellet 42 eliminates the possibility of escape of molten zinc and consequent shorting of the battery. Moreover, the pelletized zinc heat sink of FIG. 10 has a greater heat capacity per unit volume than the zinc disk heat sink shown in FIG. 9.

The heat paper layers 11 and 13 may comprise, by way of example, a stoichiometric mixture of zirconium powder and barium chromate intimately mixed with and supported on a suitable fibrous carrier of heat resistant material such as asbestos or the like. The calorific value of the heat paper layers 11 and 13 is regulated with respect to the weight of the heat sink element 12 or 40 so that when the battery is activated at the maximum ambient temperature for which it is designed to operate, the heat absorbed by the zinc approximates the maximum possible without appreciably exceeding the fusion temperature of the zinc.

In FIG. 2 the components of the thermal cell 10 are illustrated in greater detail. Although the principle of the fusible metal heat sink herein described is applicable to fused electrolyte systems generally, the present detailed description will be limited to a preferred combination of electrolyte and electrodes which has been found to give excellent results. Thus, in FIG. 2, the cell 10 includes a unitary compressed pellet 16 having a catholyte layer 17, an anolyte layer 18, and an anode layer 19. The catholyte layer 17 may comprise a pressed powder mixture of approximately three parts by weight of a eutectic mixture of KCl and LiCl and five parts by weight of $V_2O_5$. The anolyte layer 18 may comprise a pressed powdered mixture of approximately 38 wt. % kaolin and 62 wt. % of the eutectic mixture of KCl and LiCl. The anode layer 19 may comprise pressed powdered magnesium.

The cell 10 further includes a cell connector 20 of nickel having circular disk portions 21 and 22 connected together by an integral joint 23. As shown in FIG. 2, the disk portions 21 and 22 of the cell connector may be bent into superimposed relationship to enclose a layer of heat paper 24 similar to the heat paper 11. The disk portion 22 of the cell connector 20 is provided with a cathode coat 26 on the lower surface thereof which is adapted to be placed in intimate engagement with the upper surface of the catholyte layer 17. The cathode coat 26 may comprise a fused mixture consisting of approximately 78 wt. % $V_2O_5$ and 22 wt. % $B_2O_3$.

In FIG. 3 there is shown a graph illustrating the heat capacity of zinc metal. This graph demonstrates that one gram of zinc at −54° C. may absorb 57 calories of heat to increase its temperature to 420° C. and at this temperature may absorb 9 calories of heat as the latent heat of fusion, whereas one gram of zinc at an initial temperature of 74° C. may absorb 57 calories of heat to increase its temperature of 420° C. and at this temperature may absorb 20.5 calories of heat as the latent heat of fusion. Thus, the zinc metal comprising the heat sinks 12 or 40 may be heated to its fusion temperature of 420° C. from initial temperatures over a range of from −54° C. to +74° C. by a given amount of heat and when the fusion temperature of 420° C. is reached, the molten zinc then may serve as a thermal buffer capable of releasing heat to its environment without a change in temperature if the environment is at temperatures less than 420° C. or capable of absorbing heat from its environment without a change in temperature if its environment should be at temperatures higher than 420°C.

The zinc metal utilized in the heat sinks of the secondary heat system of the present invention is the preferred fusible material for a thermal cell of the type described above because of its low specific heat of 0.09–0.11 cal., its high heat of fusion of 28 cal/gm., its high specific gravity of 7.14, its good thermal conductivity, and its fusion temperature of about 420° C. (specifically, 419.47° C.) which is approximately midway between the optimum maximum operating temperature of the above-described cells and their minimum activation temperature. The latent heat of fusion of the heat sinks provide heat at the operting temperature of the cells to offset radiation losses for an extended period of time after activation at ambient temperatures ranging from −54° C. to +74° C.

Figure 4:
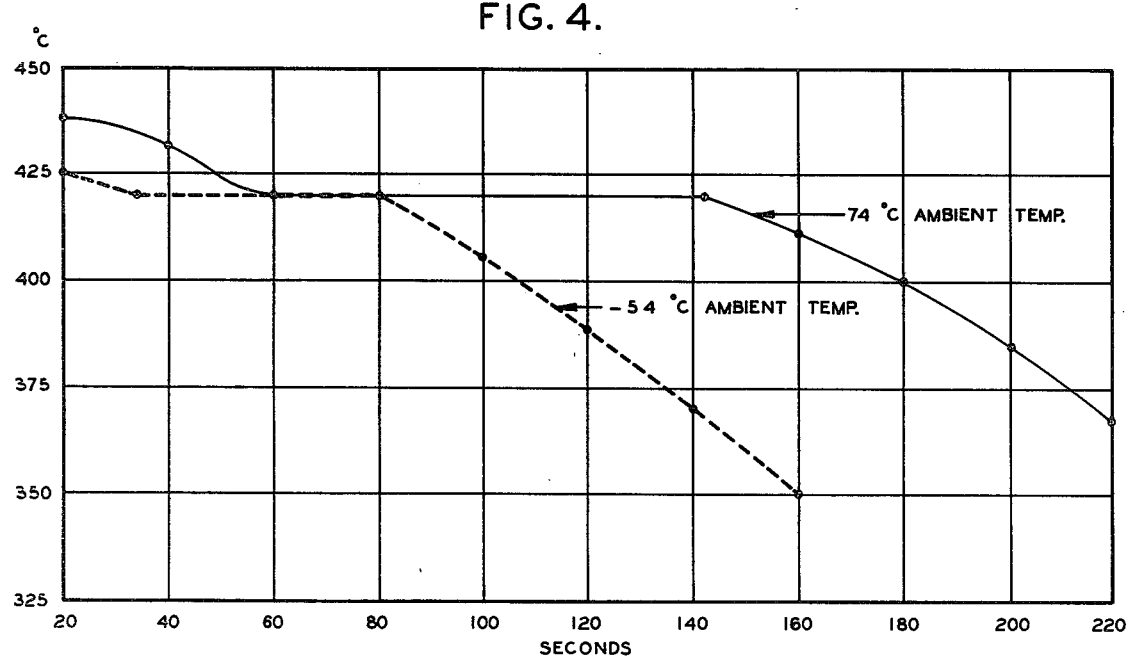
FIG. 4 is a graph showing the temperatures of a zinc heat sink in the single cell thermal battery illustrated in FIG. 1 over elapsed periods of time when the battery is activated at different ambient temperatures.

FIGS. 4 and 5 comprise time vs temperature curves for a zinc heat sink (FIG. 4) as compared with a steel heat sink (FIG. 5) starting at both low and high ambient temperatures. The data were obtained by activating a single cell experimental battery generally similar to the arrangement of FIG. 1 with a cell diameter of 2.165 inches, a cell pellet thickness of 0.075 inches, a zinc heat sink diameter of 2.165 inches and a thickness of 0.080 inches for FIG. 4, and a steel heat sink diameter of 2.165 inches and a thickness of 0.070 inches for FIG. 5. The test readings were taken by means of a thermocouple embedded between the heat paper 11 and the heat sink 12 with the cell under a mean load of 60 ma/cm$^2$.

From a comparison of FIGS. 4 and 5 it will be evident first of all that for any given range of operating temperture the use of the zinc heat sink (FIG. 4) in accordance with the present invention resulted in holding the operating temperature of the battery for a substantially longer period of time as contrasted with the use of a steel heat sink (FIG. 5). Furthermore, it will be noted that the use of the fusible zinc heat sink in FIG. 4 prevented the temperature of the heat sink from exceeding the preferred maximum operating temperature of 450° C. when the battery was activated at an ambient temperature of 74° C., whereas in FIG. 5 using the steel heat sink the temperature under the same ambient conditions exceeded 450° C. for almost the first 40 seconds of the life cycle. Thus, the present invention results in prolonging the useful life of the battery by extending the period of time the battery is maintained above its minimum operating temperature and also, in case the battery is activated at elevated ambient temperatures, by preventing excessive peak temperatures. While substituting the zinc heat sink for the steel heat sink substantially improves the useful life of a battery, further improvement may be realized by using a multiplicity of zinc heat sink assemblies. For example, under commonly used current densities the life of a battery may be increased four to eightfold by the use of multiple zinc heat sink assemblies.

Figure 6:
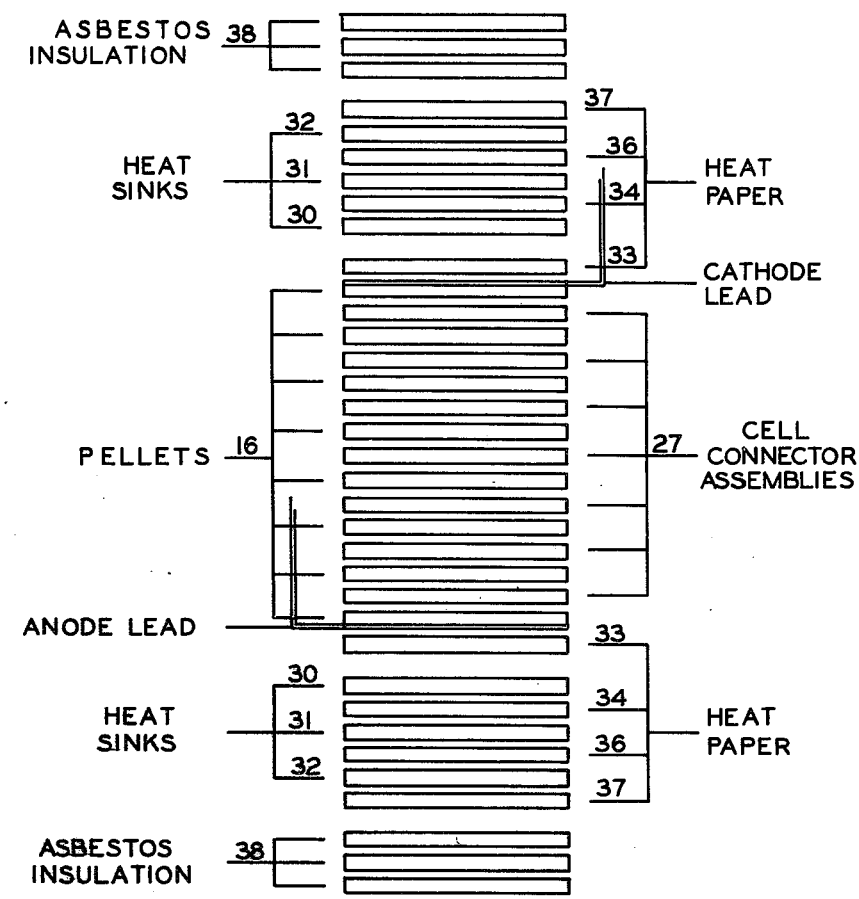
FIG. 6 is a diagrammatic, expanded, side elevational view of a thermal battery embodying the secondary heat system of the present invention as applied to a thermal battery having an assembly of eight cells.
Figure 8:
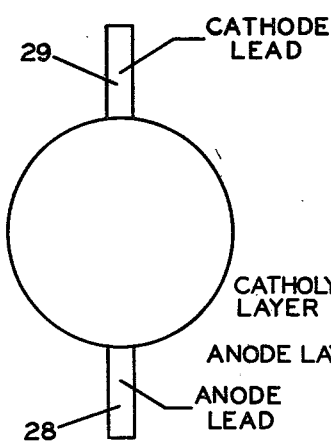
FIG. 8 is a top plan view of the structure shown in FIG. 7.
Figure 7:
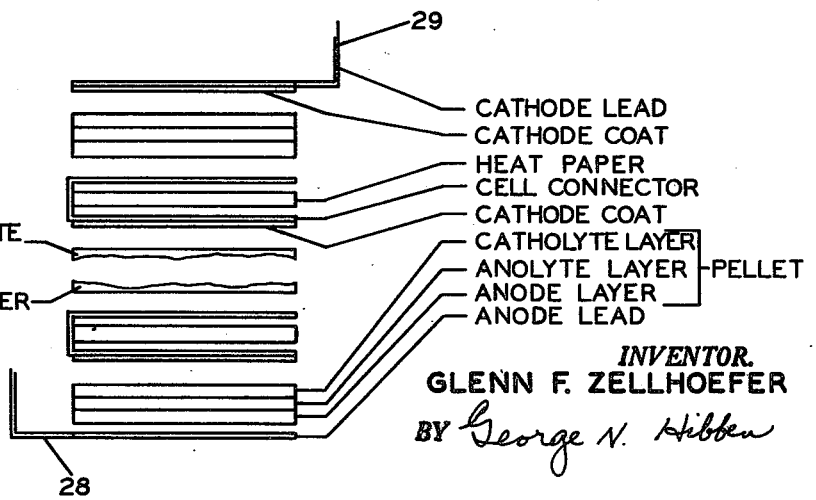
FIG. 7 is an enlarged view of the cell assembly of FIG. 6 with the middle cells of the group broken away.

The heat sink assemblies comprising the present invention may be utilized in batteries having various numbers of thermal cells arranged in groups of various sizes. In FIGS. 6 to 8 there is shown a battery comprising a group of eight cells which are similar to the cell units of the type illustrated in FIG. 2 and described in detail above. These cells each comprise a catholyte-anolyte-anode pellet 16, a cell connector assembly 27 (similar to the cell connector 20 of FIG. 1), and a heat paper layer, all arranged in the same manner as shown in FIG. 2. The cells of the structure shown in FIG. 6 are shown in somewhat enlarged detail in FIG. 7. The lower cell of the group of eight of FIG. 6 is provided with an anode lead 28 and the cell connector of the upper cell is provided with a cathode lead 29.

In stacked relation on the top and bottom of the eight cell assembly are the heat sink assemblies embodying the present invention. As shown in FIG. 6 these heat sink assemblies comprise fusible zinc heat sinks 30, 31, and 32 with layers of heat paper 33, 34, 36, and 37 interposed between and disposed at the ends of the heat sinks. On the top and bottom of the stack are three layers 38 of asbestos insulation which serves the purpose of thermally insulating the battery cells and heat sinks. The heat paper which is contained within each of the eight cell units has the necessary heating value to activate the cell. The heating value of the heat paper adjacent the heat sinks and the weight of the heat sinks are so proportioned to provide a maximum resevoir of heat in the secondary heat system without exceeding the optimum operating temperature of the cells when the battery is activated at the maximum ambient temperature for which it is designed to operate.

Heat sinks employing other types of fusible metal or alloy in place of the zinc metal may also be used with beneficial results. For example, an alloy comprising 68 wt. % magnesium and 32 wt. % aluminum may be utilized to advantage, particularly with other types of thermal cells having somewhat higher operating temperature ranges. The fusion temperature of this alloy is about 437° C.

Also, the foregoing description refers particularly to the electrochemical system Mg/KCl-LiCl-Kaolin/KCl-LiCl-$V_2O_5$-$B_2O_3$/Ni. However, it is to be understood that the fusible metal heat sink of the present invention is also applicable to thermal batteries having other electrochemical systems.

I claim:

1. In a thermal battery, the combination in stacked arrangement of (A) a cell assembly comprising at least one fusible electrolyte cell including a mass of fusible electrolyte, a cathode, an anode, and heat producing means for energizing the cell, (B) heat sink means comprising at least one heat sink unit disposed at each opposite side of said cell assembly, said unit comprising a protective metal housing containing a fusible metal having a fusion temperature between the maximum operating temperature and the minimum activation temperature of said cell assembly, (C) heat producing means interposed between said cell assembly and the innermost sides of said heat sink units and also disposed at the outermost sides of said heat sink units for fusing said fusible metal, and (D) thermal insulation means at the outermost sides of the stacked arrangement.

2. The combination of claim 1 further characterized in that said fusible metal comprises zinc.

3. The combination of claim 1 further characterized in that said cell assembly comprises a plurality of said fusible electrolyte cells arranged in stacked relation and electrically connected to each other, and said heat sink means comprises a plurality of said heat sink units in stacked relation at each opposite side of the stack of cells.

4. The combination of claim 1 further characterized in that said fusible metal comprises a pelletized mixture of zinc powder and a refractory non-flow agent.

5. The combination of claim 4 further characterized in that said non-flow agent is selected from the group consisting of zirconium oxide and alumina.

* * * * *